(12) United States Patent
Wu et al.

(10) Patent No.: US 11,315,061 B2
(45) Date of Patent: Apr. 26, 2022

(54) SYSTEM AND METHOD FOR DOSSIER CREATION WITH RESPONSIVE VISUALIZATION

(71) Applicant: MicroStrategy Incorporated, Tysons Corner, VA (US)

(72) Inventors: Qiong Wu, Zhejiang (CN); Xiaodi Zhong, Zhejiang (CN)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 0 days.

(21) Appl. No.: 16/863,197

(22) Filed: Apr. 30, 2020

(65) Prior Publication Data

US 2021/0342766 A1 Nov. 4, 2021

(51) Int. Cl.
| | |
|---|---|
| G06Q 10/06 | (2012.01) |
| G06Q 10/10 | (2012.01) |
| G06F 3/0482 | (2013.01) |
| G06F 16/242 | (2019.01) |
| G06T 11/20 | (2006.01) |
| G06F 16/248 | (2019.01) |

(52) U.S. Cl.
CPC ..... *G06Q 10/06393* (2013.01); *G06F 3/0482* (2013.01); *G06F 16/248* (2019.01); *G06F 16/2428* (2019.01); *G06Q 10/10* (2013.01); *G06T 11/206* (2013.01)

(58) Field of Classification Search
CPC .............. G06Q 10/06393; G06Q 10/10; G06F 16/2428; G06F 16/248; G06F 3/0482; G06T 11/206

USPC .......................................................... 705/7
See application file for complete search history.

(56) References Cited

U.S. PATENT DOCUMENTS

| | | | | |
|---|---|---|---|---|
| 6,988,092 | B1 * | 1/2006 | Tang | G06Q 10/06 705/7.39 |
| 7,136,827 | B2 * | 11/2006 | Eicher | G06Q 10/0635 705/7.28 |
| 8,306,845 | B2 * | 11/2012 | D'Imporzano | G06Q 10/06393 705/7.29 |
| 8,560,377 | B2 * | 10/2013 | Ohnemus | G06Q 10/06 705/7.39 |
| 8,683,370 | B2 * | 3/2014 | Marchand | G06Q 10/067 715/772 |
| 9,294,361 | B1 * | 3/2016 | Choudhary | G06F 16/9024 |
| 9,491,059 | B2 * | 11/2016 | Fletcher | H04L 29/08072 |
| 9,760,240 | B2 * | 9/2017 | Maheshwari | G06F 16/2474 |
| 9,864,797 | B2 * | 1/2018 | Fletcher | H04L 41/22 |
| 9,934,538 | B2 * | 4/2018 | Hunt | H04L 67/12 |
| 10,037,506 | B2 * | 7/2018 | Mole | G06Q 10/06393 |
| 10,102,491 | B2 * | 10/2018 | Connolly | G06Q 10/0639 |

(Continued)

*Primary Examiner* — William D Titcomb

(74) *Attorney, Agent, or Firm* — Muncy, Geissler, Olds & Lowe, P.C.

(57) ABSTRACT

A method (and system) includes retrieving a dataset from a database, creating a report including a graphical representation of the dataset, the graphical representation of the dataset including a customizable, responsive visualization of a key performance indicator and displaying the report on a graphical user interface. The visualization of the key performance indicator displays all necessary data in a single visualization. The method (and system) provides responsive layout creating to automatically generate and arrange the visualization of the key performance indicator.

13 Claims, 22 Drawing Sheets

(56) References Cited

U.S. PATENT DOCUMENTS

| | | | |
|---|---|---|---|
| 10,193,775 B2 * | 1/2019 | Fletcher | G06F 3/04817 |
| 10,209,956 B2 * | 2/2019 | Fletcher | H04L 41/069 |
| 10,417,108 B2 * | 9/2019 | Tankersley | G06T 11/206 |
| 10,417,225 B2 * | 9/2019 | Tankersley | G06F 11/3006 |
| 10,447,555 B2 * | 10/2019 | Fletcher | G06Q 10/06393 |
| 10,467,353 B2 * | 11/2019 | Santarone | G06Q 10/06393 |
| 11,087,263 B2 * | 8/2021 | Boe | H04L 41/5009 |
| 2016/0216875 A1 * | 7/2016 | Soo | G06F 3/04842 |
| 2019/0163339 A1 * | 5/2019 | Zhu | G06F 3/0486 |
| 2019/0268233 A1 * | 8/2019 | Singh | G06Q 10/06393 |
| 2021/0019338 A1 * | 1/2021 | Grampurohit | G06F 3/0481 |

* cited by examiner

SYSTEM AND METHOD FOR DOSSIER CREATION WITH RESPONSIVE VISUALIZATION

BACKGROUND OF THE INVENTION

Field of the Invention

The present invention generally relates to a method and system for displaying data, and more particularly to a method and system for creating business analytic reports with responsive visualizations.

Description of the Related Art

Large databases are common in business today. Indeed, the amount of data available to business organizations today is rapidly increasing. Thus, a challenge for many organizations is to find a way to timely sort and present all relevant information while filtering unnecessary information.

In reporting systems, such as decision support systems, business intelligence systems and on-line analytical processing (OLAP) systems, data sorting and extraction are used to retrieve and present data in an efficient manner. Additionally, the reporting systems provide a means for a user to clearly and creatively present an interactive visualization of the relevant data.

Specifically, dossier building systems and programs or report system services documents (RSD) exists in which users can create a dashboard or canvas having one more datasets displayed in different containers. The data sets in each container display an interactive visualization of user selected data (e.g., a table, graph, pie chart, etc.). Particularly, a RSD contains datasets from one or more reports. The data is positioned and formed into a single visual representation of the data that can be presented to a user. The datasets can be displayed in a document or a RSD dashboard. When a user creates a document, report, dossier, visualization, or dashboard, the user specifies the data that appears. Furthermore, the user can control the layout, formatting and grouping of the data.

One such type of visualization is a key performance indicator (KPI). A KPI is a visual cue that displays an amount of progress with respect to a metric. That is, the KPI can visualize a current value and status of a metric. The KPI allows a user to track trends in a metric over time to determine the level of achievement of the metric.

FIG. 22 illustrates a report/dossier 2200 including conventional KPIs. Specifically, the report/dossier 2200 includes four KPI visualizations 2202, each depicting a different metric. That is, the four KPI visualizations 2202 respectively depict yearly profits for books, electronics, movies and music. Each KPI lists the metric by name 2204 and lists the total yearly profit 2206. The conventional KPIs do not, however, on their own, provide any further information regarding the progress of the metric (i.e., profit) over time. As is illustrated in FIG. 22, in conventional report/dossier building systems, it is necessary to also include one or more additional visualizations to display data trends to indicate the progress of the metric over time. For example, in FIG. 22, the report/dossier 2200 also includes chart visualizations 2208 corresponding to each of the KPIs 2202. Thus, with conventional KPI visualizations, user demand cannot be met with just the KPI visualization. Another limitation of conventional KPIs is that the user must manually create the layout of each KPI, and additional supporting visualizations, within the report/dossier. Furthermore, conventional KPIs require additional functions, such as filters and derived metrics. Finally, conventional KPI only provides a metric and a metric name.

SUMMARY OF THE INVENTION

In view of the foregoing and other exemplary problems, drawbacks, and disadvantages of the conventional methods and structures, an exemplary feature of the present invention is to provide a method and system for generating reports, which provides an improved KPI visualization that allows a user to display all necessary data in a single visualization, efficiently, while also automating report/dossier creation by providing responsive layout creation. Responsive layout is one advantage of the smart KPI in accordance with the present invention. The display of the KPI cards is calculated based on the container. For instance, if a mobile device is used to open a dossier that was created on a computer, the card size and font size would be recalculated based on the phone size. The smart KPI cards can find the most proper way to be displayed on any device with any container size.

In a first, exemplary, non-limiting aspect of the present invention, a method includes retrieving a dataset from a database, creating a report including a graphical representation of the dataset, the graphical representation of the dataset including a customizable, responsive visualization of a key performance indicator and displaying the report on a graphical user interface.

In a second, exemplary, non-limiting aspect of the present invention, a non-transitory computer processor-readable storage medium storing instructions is configured for execution by a computer for retrieving a dataset from a database, creating a report including a graphical representation of the dataset, the graphical representation of the dataset including a customizable, responsive visualization of a key performance indicator and displaying the report on a graphical user interface.

In a third, exemplary, non-limiting aspect of the present invention, a system includes a database storing a dataset, a processor configured to create a report including a graphical representation of the dataset, the graphical representation of the dataset including a customizable, responsive visualization of a key performance indicator and a graphical user interface configured to display the report.

In accordance with the above, exemplary aspects of the present invention, a method and system are provided in which a user is able to generate a report/dossier, which provides an improved KPI visualization that allows a user to display all necessary data in a single visualization, efficiently. The KPI visualizations in accordance with certain exemplary aspects of the present invention, a user is able to display, in a single visualization, a key metric, various category metrics, information relating to previous data, a percentage of time with unit, and data regarding trends. Indeed, in accordance with certain exemplary aspects of the present invention, instead of showing only one pure metric within a visualization, the visualizations of the present invention are also configured to show data of different categories, fluctuation trends, previous time, and percentage of previous time and tool tips, along with data trends as well. This allows the KPI visualization of the present method and system to display numbers of multiple elements at same time in a single visualization and also provide information with icons and images, which are user-friendly and easily readable. The method and system also automates report/dossier creation by providing responsive layout creation. That is, in accordance with certain exemplary aspects of the present invention, the KPI visualization can automatically and smartly select its position within the dossier/report and, when more than one visualization is presented, automatically arrange the layout of visualizations. The system and method also includes responsive rules so that the user can easily customize the shape and appearance of the KPI visualization.

Moreover, as noted above, a conventional KPI only provides a metric and a metric name. The smart KPI, in accordance with the present invention, enables users to see trends over time and provides a trend indicator along with the primary data to provide further insights. Furthermore, users can have multiple KPI cards in one container. The present method and system provide at least four advanced modes (e.g., auto, horizontal, vertical, grid, etc.) to help users better display their data. Lastly, the smart KPI of the present invention is highly customizable and users can freely use colors and color thresholds.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
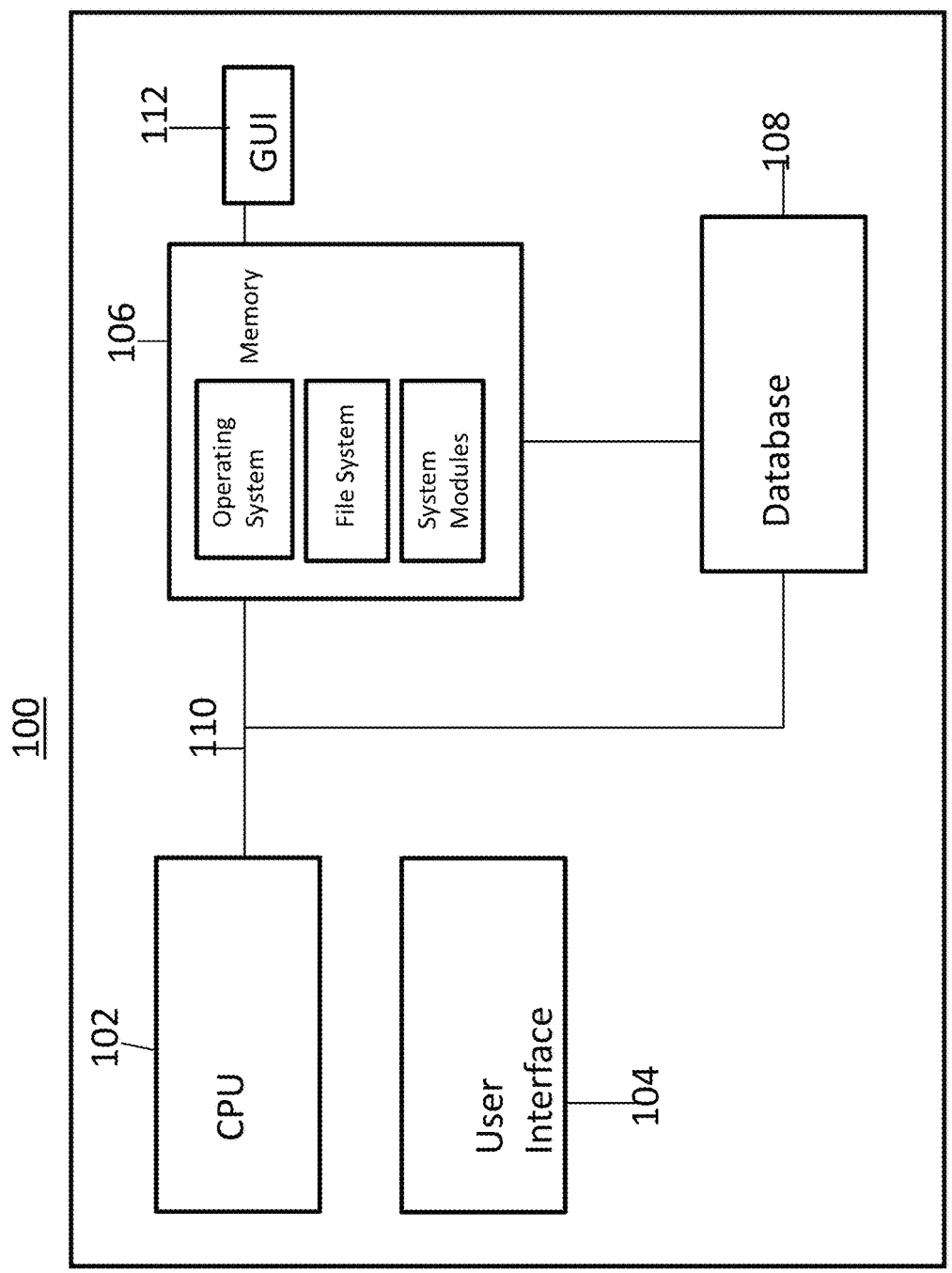
FIG. 1 illustrates a system 100 according to certain exemplary embodiments of the present invention.

Referring now to the drawings, and more particularly to FIGS. 1-21, there are shown exemplary embodiments of the method and structures according to the present invention.

FIG. 1 is a block diagram illustrating a system 100 according certain exemplary aspects of the invention. Specifically, the system 100 is configured to create reports/documents/dossiers including a visualization of one or more datasets. As is illustrated in FIG. 1, the system 100 includes a CPU 102 having a user interface 104 (e.g., mouse, keyboard, touch screen, etc.). The CPU 102 is connected to a memory 106, storing an operating system, file system and computer system modules configured to perform the method of the present invention (e.g., process data and generate reports), and a database 108, storing one or more datasets, by a system bus 110. The system 100 includes a graphical user interface (GUI) 112 configured to receive and display a generated report.

Figure 2:
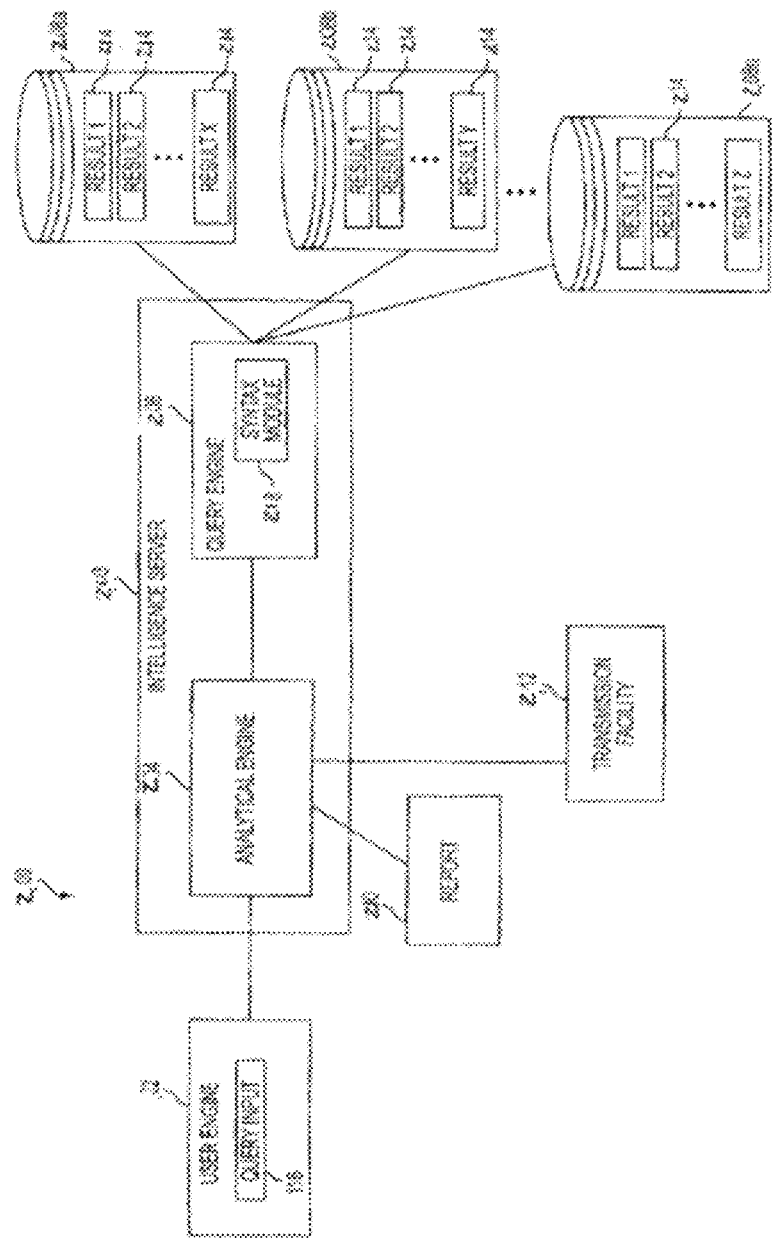
FIG. 2 illustrates a system 200 according to certain exemplary embodiments of the present invention.

FIG. 2 further defines elements of the system in accordance with certain exemplary embodiments of the present invention. Specifically, FIG. 2 is a block diagram illustrating a system 200 by which a variety of data resources may be accessed for business analytic, report generation and other intelligence purposes according to an embodiment of the invention. According to certain exemplary embodiments of the invention, the system 200 may comprise an online analytical processing (OLAP) decision support system (DSS). In particular, FIG. 2 may comprise a portion of the Microstrategy platform, which provides a preferred system in which the present invention may be implemented.

In general, through using the system 200 of the invention, analysts, managers and other users may query or interrogate a plurality of databases or database arrays to extra demographic, sales and/or financial data and information and other patterns from records stored in such databases or database arrays to identify strategic trends. The strategic trends may not be discernable without processing the queries and treating the results of the data extraction according to the techniques performed by the systems and methods of the invention. This is in part because the size and complexity of some data portfolios stored in such databases or database arrays may mask those trends.

In addition, the system 200 may enable the creation of reports or services that are processed according to a schedule. Users may then subscribe to the service, provide personalization criteria and have the information automatically delivered to the user.

As illustrated in FIG. 2, a business, government, user or other organization may access the resources of the system 200 using a user engine 202. The user engine 202 may include a query input module 216 to accept a plurality of searches, queries or other requests, via a query box or on a graphical user interface (GUI) or another similar interface. The user engine 202 may communicate with an analytical engine 204. The analytical engine 204 may include a set of extensible modules to run a plurality of statistical analyses, to apply filtering criteria, to perform a neural net technique or another technique to condition and treat data extracted from data resources hosted in the system 200, according to a query received from the user engine 202.

The analytical engine 204 may communicate with a query engine 206, which in turn interfaces to one or more data storage devices 208a, 208b . . . 208n (where n is an arbitrary number). The data storage devices 208a, 208b . . . 208n may include or interface to a relational database or another structured database stored on a hard disk, an optical disk, a solid state device or another similar storage media. When implemented as databases, the data storage devices 208a, 208b . . . 208n may include or interface to, for example, an Oracle™ relational database such as sold commercially by Oracle Corporation, an IBM Informix™ database, a Database 2 (DB2) database, a Teradata database, or another data storage device or query format, platform or resource such as an OLAP format, a Standard Query Language (SQL) format, a storage area network (SAN), or a Microsoft Access™ database. It should be understood that while data storage devices 208a, 208b . . . 208n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a macOS operating system, a Windows™ 10 operating system, a Unix operating system, or a a Linux operating system, or a server running an Oracle Solaris™ operating system, a macOS, Red Hat, Ubuntu or other Linux-based server operating systems. According to one embodiment of the present invention, the analytical engine 304 and the query engine 306 may comprise elements of an intelligence server 303.

The data storage devices 208a, 208b ... 208n may be supported by a server or another resource and may, in some embodiments, include redundancy, such as a redundant array of independent disks (RAID), for data protection. The storage capacity of any one or more of the data storage devices 208a, 208b ... 208n may be of various sizes, from relatively small datasets to very large database (VLDB)-scale datasets, such as warehouses holding terabytes of data or more. The fields and types of data stored within the data storage devices 208a, 208b ... 208n may also be diverse, and may include, for instance, financial, personal, news, marketing, technical, addressing, governmental, military, medical or other categories of data or information.

The query engine 206 may mediate one or more queries or information requests from those received from the user at the user engine 202 to parse, filter, format and otherwise process such queries to be submitted against the data contained in the data storage devices 208a, 208b ... 208n. Thus, a user at the user engine 202 may submit a query requesting information in SQL format, or have the query translated to SQL format. The submitted query is then transmitted via the analytical engine 204 to the query engine 206. The query engine 206 may determine, for instance, whether the transmitted query may be processed by one or more resources of the data storage devices 208a, 208b ... 208n in its original format. If so, the query engine 206 may directly transmit the query to one or more of the resources of the data storage devices 208a, 208b ... 208n for processing.

If the transmitted query cannot be processed in its original format, the query engine 206 may perform a translation of the query from an original syntax to a syntax compatible with one or more of the data storage devices 208a, 208b ... 208n by invoking a syntax module 218 to conform the syntax of the query to standard SQL, DB2, IBM Informix™, Teradata formats or to other data structures, syntax or logic.

The query engine 206 may likewise parse the transmitted query to determine whether it includes any invalid formatting or to trap other errors included in the transmitted query, such as a request for sales data for a future year or other similar types of errors. Upon detecting an invalid or an unsupported query, the query engine 206 may pass an error message back to the user engine 202 to await further user input.

When a valid query such as a search request is received and conformed to a proper format, the query engine 206 may pass the query to one or more of the data storage devices 208a, 208n ... 208n for processing. In some embodiments, the query may be processed for one or more hits against one or more databases in the data storage devices 208a, 208b ... 208n. For example, a manager of a restaurant chain, a retail vendor or another similar user may submit a query to view gross sales made by the restaurant chain or retail vendor in the State of New York for the year 1999. The data storage devices 208a, 208b ... 208n may be searched for one or more fields corresponding to the query to generate a set of results 214.

Although illustrated in connection with each data storage device 208 in FIG. 1, the results 214 may be generated from querying any one or more of the databases of the data storage devices 208a, 208b ... 208n, depending on which of the data resources produce hits from processing the search query. In some embodiments of the system 200 of the invention, the results 214 may be maintained on one or more of the data storage devices 208a, 208b ... 208n to permit one or more refinements, iterated queries, joinders or other operations to be performed on the data included in the results 214 before passing the information included in the results 214 back to the analytical engine 204 and other elements of the system 200.

When any such refinements or other operations are concluded, the results 214 may be transmitted to the analytical engine 204 via the query engine 206. The analytical engine 204 may then perform statistical, logical or other operations on the results 214 for presentation to the user. For instance, in the State of New York reached $1 M in sales at the earliest time in the year 2019. Or, the user may submit a query asking for an average, a mean and a standard deviation of an account balance on a portfolio of credit or other accounts.

The analytical engine 204 may process such queries to generate a quantitative report 210, which may include a table or other output indicating the results 214 extracted from the data storage devices 208a, 208b ... 208n. The report 210 may be presented to the user via the user engine 202, and, in some embodiments, may be temporarily or permanently stored on the user engine 202, a client machine or elsewhere, or printed or otherwise output. In some embodiments of the system 200 of the invention, the report 210 or other output may be transmitted to a transmission facility 212, for transmission to a set of personnel via an email, an instant message, a text-to-voice message, a video or via another channel or medium. The transmission facility 212 may include or interface to, for example, a personalized broadcast platform or service. Similarly, in some embodiments of the invention, more than one user engine 202 or other client resource may permit multiple users to view the report 210, such as, for instance, via a corporate intranet or over the Internet using a Web browser. Various authorization and access protocols may be employed for security purposes to vary the access permitted users to such report 210 in such embodiments.

Additionally, an administrative level user may create a report as part of a service. Subscribers/users may then receive access to reports through various types of data delivery devices including telephones, email, wireless communication devices, mobile phones, tablets, and many others. In addition, subscribers may specify trigger conditions so that the subscriber receives a report only when that condition has been satisfied. The platform of FIG. 2 may have many other uses, as described in detail with respect to the MicroStrategy platform, the details of which will be appreciated by one of ordinary skill in the reporting and decision support system art.

Figure 3:
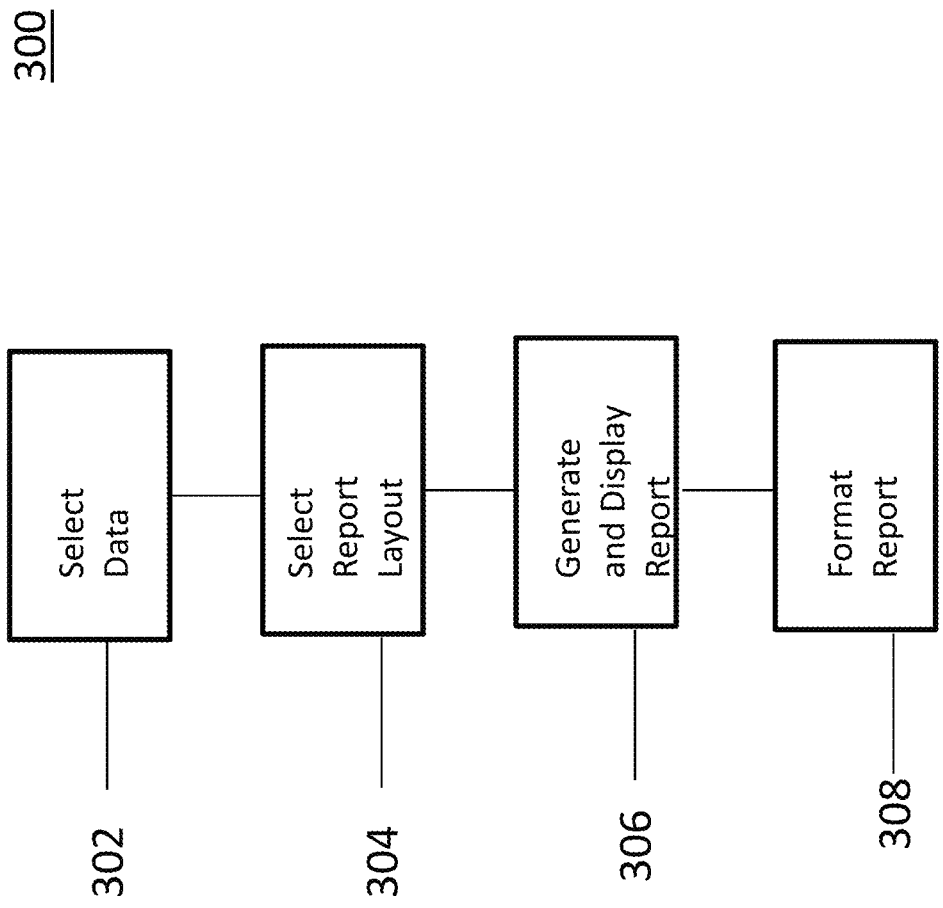
FIG. 3 illustrates a method 300 according to certain exemplary embodiments of the present invention.

FIG. 3 illustrates a basic flow chart of a method 300 for generating a report according to certain exemplary embodiments of the invention. At step 302, the system receives a request from a user for selecting one or more specific datasets from the database/data storage devices. At step 304, the user selects a report layout 304. At step 306, the system generates and displays the report based on the selected layout and selected dataset(s). At step 308, the user formats the layout and specific containers included in the layout.

Figure 4:
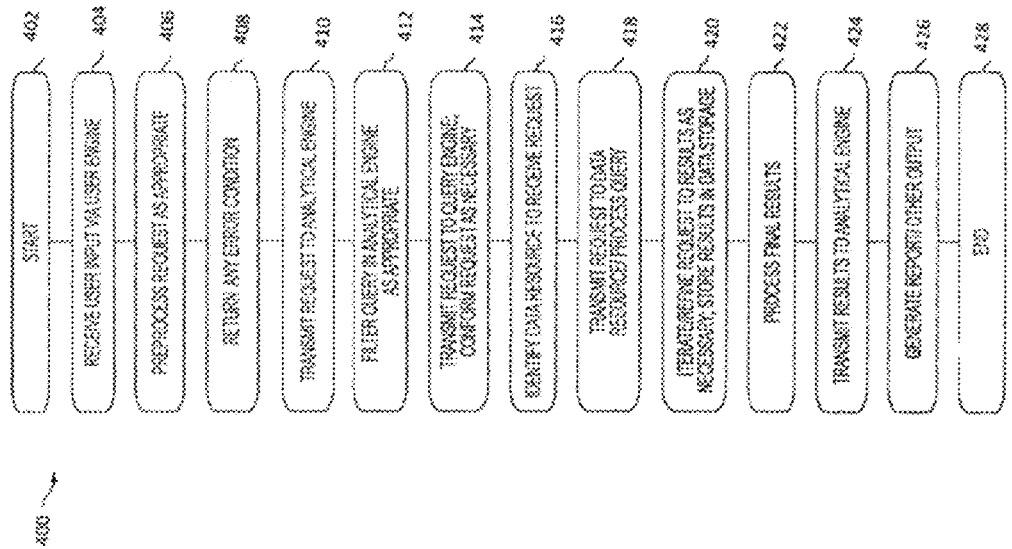
FIG. 4 illustrates a method 400 according to certain exemplary embodiments of the present invention.

The specific steps performed in a method 400 for generating a report according to certain exemplary embodiments of the present invention are illustrated in the flowchart of FIG. 4. In step 402, the method 400 begins. In step 404, the user may supply input, such as a query or a request for information, via the user engine 202. In step 406, the user input query may be preliminarily processed, for instance, to determine whether it includes valid fields and for other formatting and error-flagging issues. In step 408, any error conditions may be trapped and an error message presented to the user, for correction of the error conditions. In step 410, if a query is in a valid format, the query may then be transmitted to the analytical engine 204.

In step 412, the analytical engine 204 may further process the input query as appropriate to ensure the intended results 214 may be generated to apply the desired analytics. In step 414, the query engine 206 may further filter, format and otherwise process the input query to ensure that the query is in a syntax compatible with the syntax of the data storage devices 208a, 208b . . . 208n. In step 416, one or more appropriate databases or other resources within the data storage devices 208a, 208b . . . 208n may be identified to be accessed for the given query.

In step 418, the query may be transmitted to the data storage devices 208a, 208b . . . 208n and the query may be processed for hits or other results 214 against the content of the data storage devices 208a, 208b . . . 208n. In step 420, the results 214 of the query may be refined, and intermediate or other corresponding results 214 may be stored in the data storage devices 208a, 208b . . . 208n. In step 422, the final results 214 of the processing of the query against the data storage devices 208a, 208b . . . 208n may be transmitted to the analytical engine 204 via the query engine 206. In step 424, a plurality of analytical measures, filters, thresholds, statistical or other treatments may be run on the results 214. In step 426, a report 210 may be generated. The report 210, or other output of the analytic or other processing steps, may be presented to the user via the user engine 202. In step 428, the method 400 ends.

Figure 5:
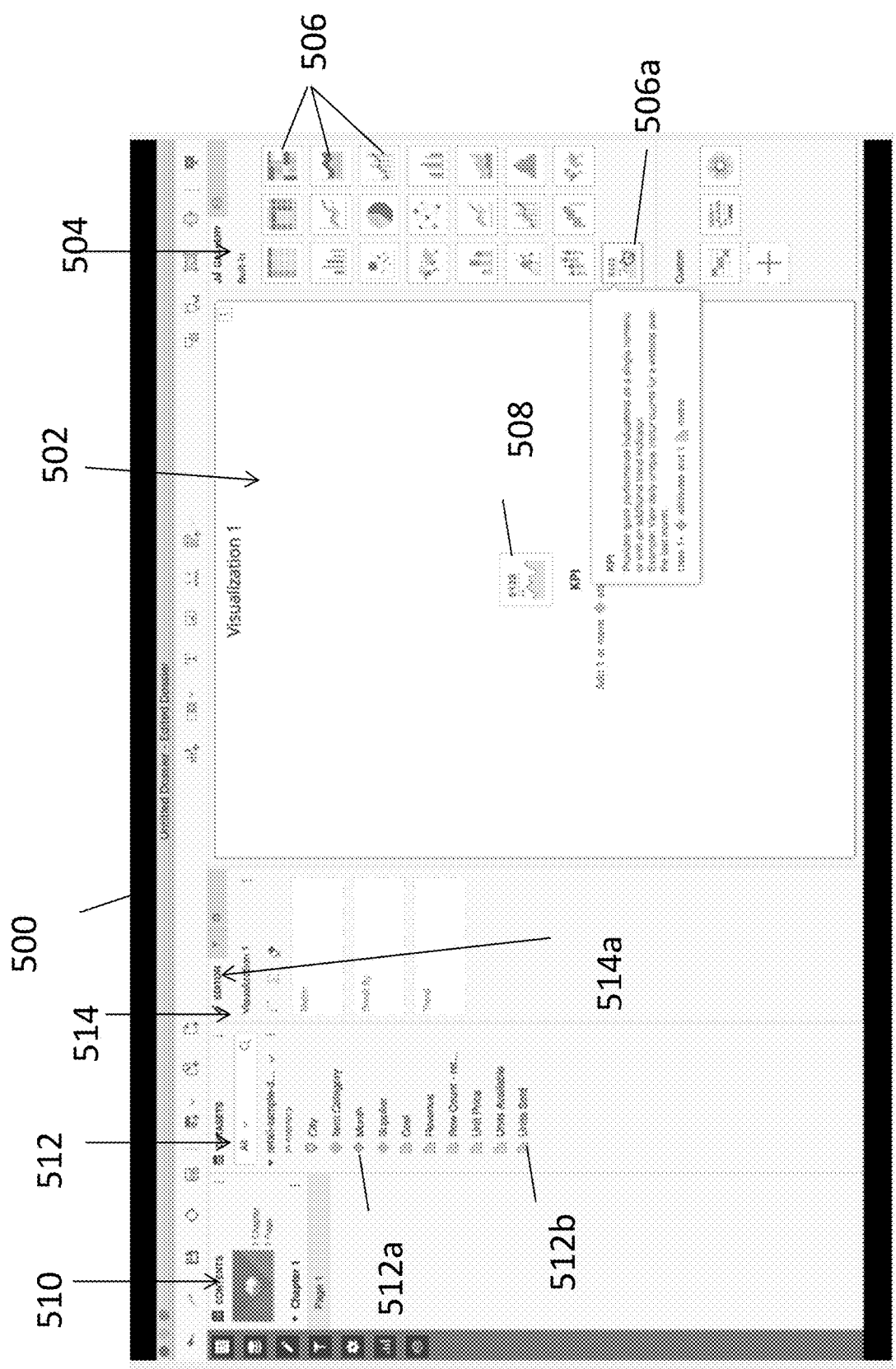
FIGS. 5-21 illustrate exemplary reports generated by the system and method of the present invention illustrating various features of the system and method of the present invention.

FIG. 5 illustrates a report 500 generated by the system and method according to certain exemplary embodiments of the present invention. As illustrated in FIG. 5, the report 500 includes one or more containers 502. The exemplary report illustrated in FIG. 5 includes a single data container 502, but any number of data containers can be included in the report. The data container 502 is configured to present a visualization of one or more datasets selected by the user, as described above with respect to FIGS. 1-4. The datasets may be visualized as a chart, pie chart, graph, list, key performance indicator (KPI), etc.

The report includes a gallery 504, including one or more built-in, user-selectable visualization widgets 506. In the present example, the gallery 504 includes a plurality of such widgets 506. In the specific example illustrated in FIG. 5, the user has selected the widget 506a corresponding to a responsive, customizable smart KPI. The KPI in accordance with certain exemplary aspects of the present invention is configured to provide quick performance indicators as a single numeric or with an additional trend indicator. When the user selects the KPI widget 506a, a corresponding KPI 508 is automatically generated as a visualization in the data container.

The report also includes a contents panel 510, a data sets panel 512 and an editor panel 514.

The contents panel 510 identifies the contents of the report/dossier 500. Specifically, the contents panel 510 lists the chapters and pages in the report/dossier 500.

The data set panel 512 lists selectable data sets. Specifically, the data set panel lists selectable attributes 512a and metrics 512b. Attributes 512a generally represent dimensions of the data, such as in time attributes (e.g., year, quarter, month, etc.), geographical dimensions (e.g., country, region, state, etc.), product (category, subcategory, item, etc.), etc. Metrics 512b, however, generally represent quantifiable aspects of the data such as revenue, cost, product count, etc.

Figure 6:
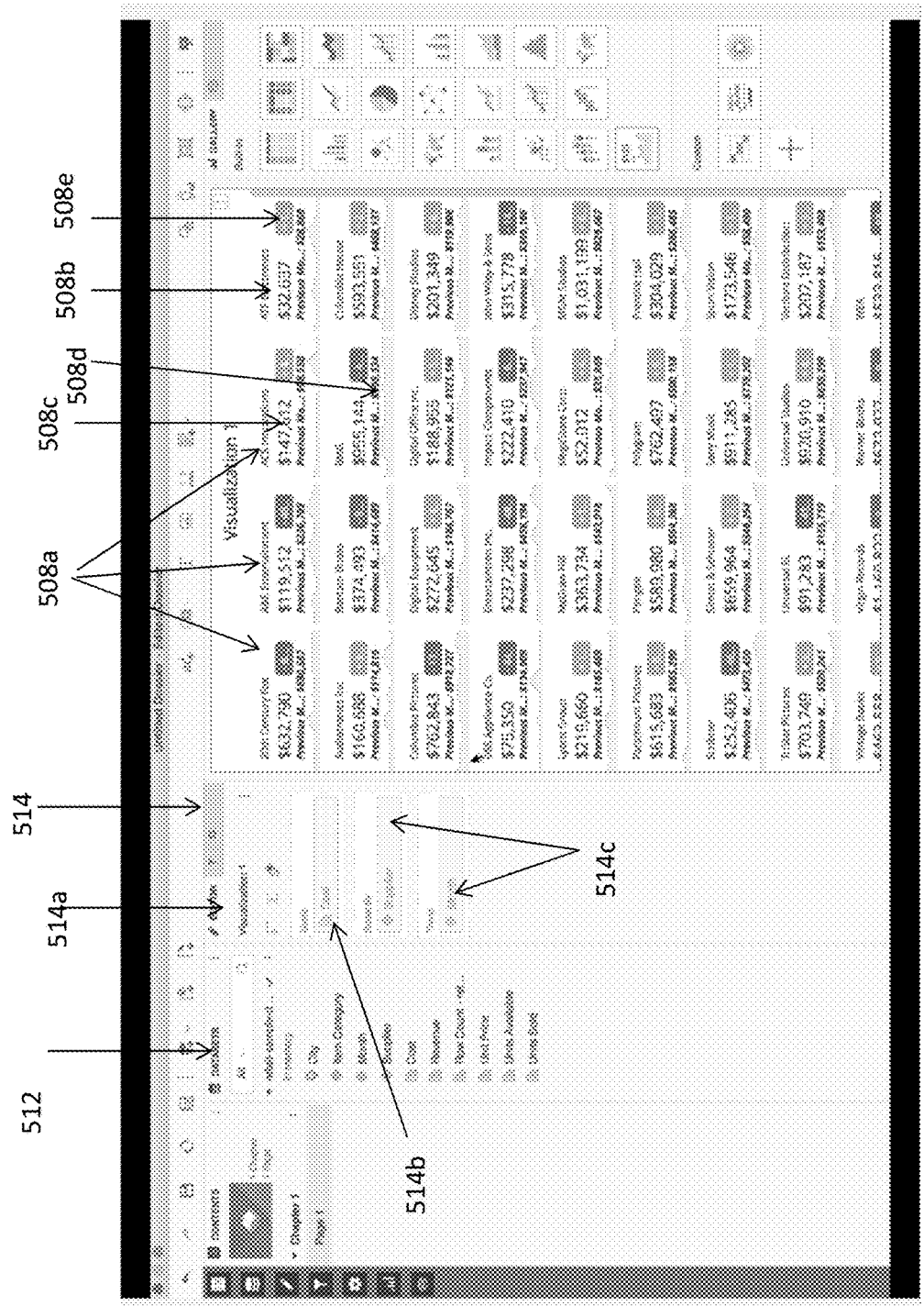

The user can access the editor panel 514 by selecting the edit icon 514a. The editor panel 514 allows a user to edit the visualization. Specifically, in the exemplary embodiment illustrated in FIG. 5, the user can add one or more metrics and/or attributes to the KPI 508 simply by dragging the one or more metrics 512a and/or attributes 512b from the data set panel 512 to the editor panel 514 (or directly to the data container 502). For example, as is illustrated in FIG. 6, the editor panel 514 includes a metric field 514b and one or more attribute fields 514c. The user can simply drag-and-drop the metrics and/or attributes from the list of data in the data sets panel 512 to the corresponding fields in the editor panel 514.

The system will then automatically generate one or more KPI cards 508a. In the exemplary embodiment illustrated in FIG. 6, the KPI 508 includes a plurality of KPI cards 508a arranged in an array. Each KPI card 508a includes a visualization of data based on the metric and/or attributes selected in the editor panel 514. For example, referring to FIG. 6, the user has selected the metric 514b "Cost" and the attributes 514c "Break by: Supplier" and "Trend: Month." Each of the KPI cards 508a displays the attribute (e.g., in this case the name of supplier) 508b and the current value of the metric (e.g., in this case cost) 508c. Additionally, corresponding to the "Trend" attribute, the KPI cards 508a display the value of the metric in a previous time period (e.g., in this case the previous month's cost) 508d and a "Trend Indicator" badge 508e providing a comparison between the current value of the metric and the value of the metric in the previous time period (e.g., in this case displaying the percentage change in cost from the previous month to the current month). Specifically, in each KPI card 508a, the large number is used to show the key metric while the smaller number below is used to show the previous data (e.g., previous month's data). A percentage of previous time unit is provided in the badge 508e. The KPI cards 508a also include a trend area 508h, which includes a graph illustrating the changes (trend) in the metric over a set period of time (e.g., year). The specific attributes and metrics illustrated in FIG. 6 are merely exemplary and any other known metric and/or attributes can use calculated and displayed. For example, for the "Trend" attribute, the user can select day, week, quarter, year, etc. instead of month as illustrated in FIG. 6. Additionally, the "Trend Indicator" badge 508e could display the change in metric (e.g., cost) by total change as opposed to percentage of change.

Figure 7:
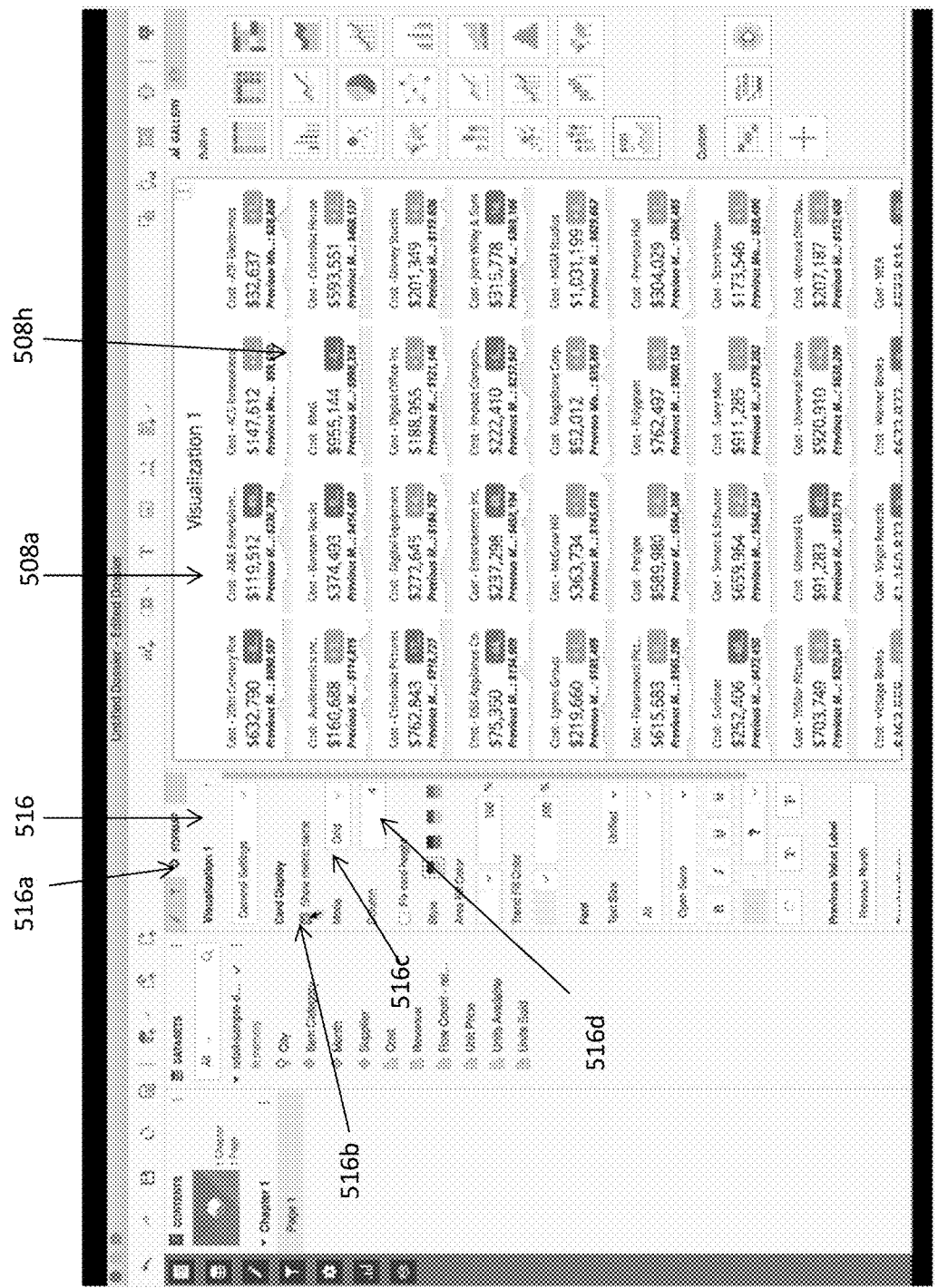

As is illustrated in FIG. 7, after the system generates the smart KPI 508, the user can access the format panel 516 by selecting the format icon 516a. The format panel 516 provides the user with options for modifying the appearance of the KPI cards 508a in the smart KPI 508.

Figure 8:
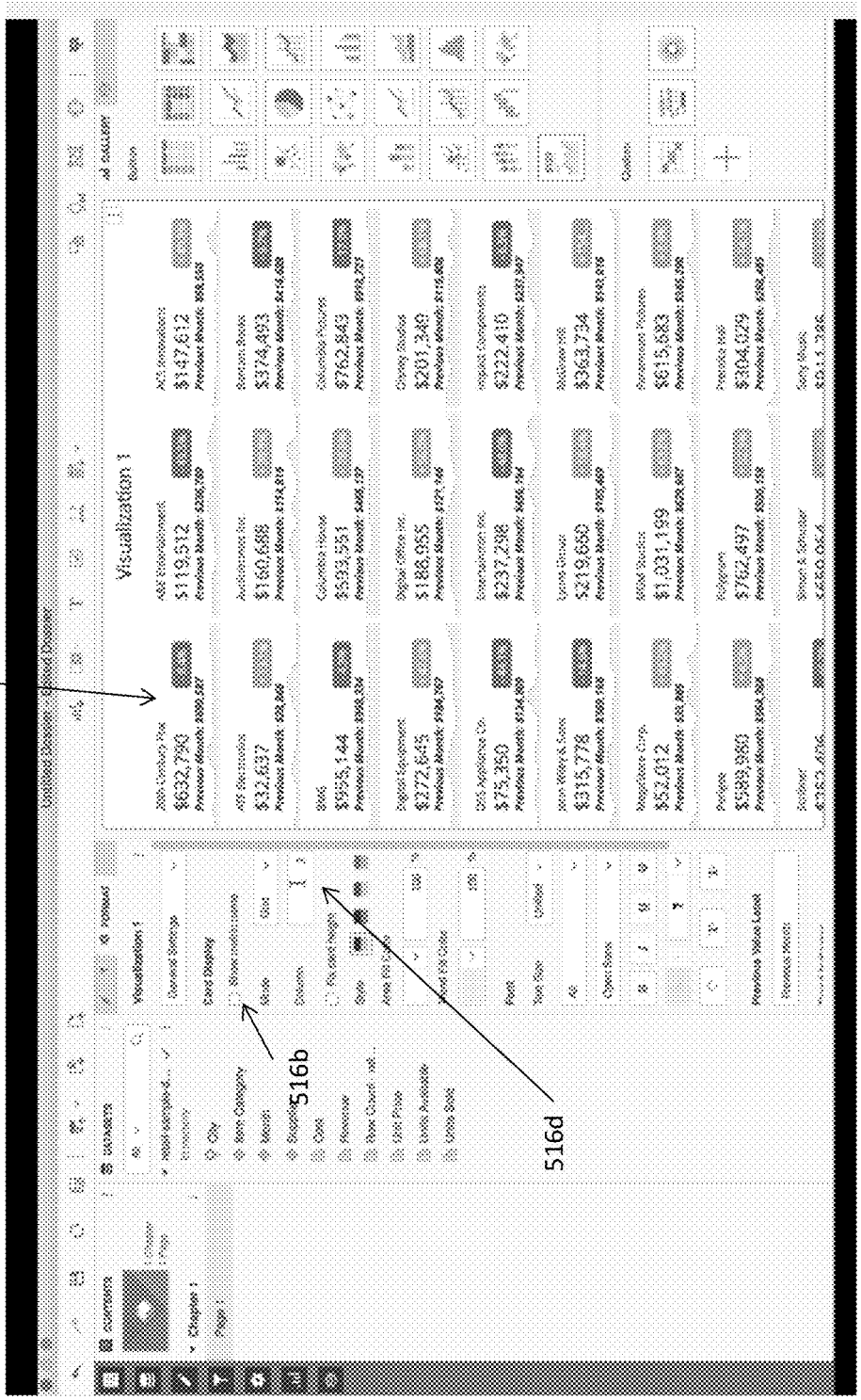

The format panel 516 includes a "Show metric name" option 516b, which allows a user to elect to show the metric name in the KPI card 508 or not show the metric name by simply checking or unchecking a box. For example, in the FIG. 7, the user has checked the box in the "Show metric name" option 516b and the name of the metric (i.e., "Cost") is displayed in the KPI cards 508a with the attribute (i.e., "Supplier Name"). Alternatively, as is illustrated in FIG. 8, the user has unchecked the box in the "Show metric name" option 516b and the name of the metric (i.e., "Cost") is not displayed in the KPI cards 508a with the attribute (i.e., "Supplier Name").

The format panel 516 also allows the user to select the arrangement of the KPI cards 508a. For example, as is illustrated in FIG. 7, the KPI cards 508a are arranged in a grid having four columns. The format panel 516 includes a mode selection option 516c including a drop down menu that allows a user to select an arrangement mode (e.g., grid in FIG. 7) and a column selection option 516d where a user can enter a number of columns (e.g., 4 in FIG. 7) in the grid. In FIG. 8, the number of columns in the column selection option 516d is changed to 3 and the smart KPI 508 includes a plurality of KPI cards 508a arranged in a grid having three columns.

Figure 9:
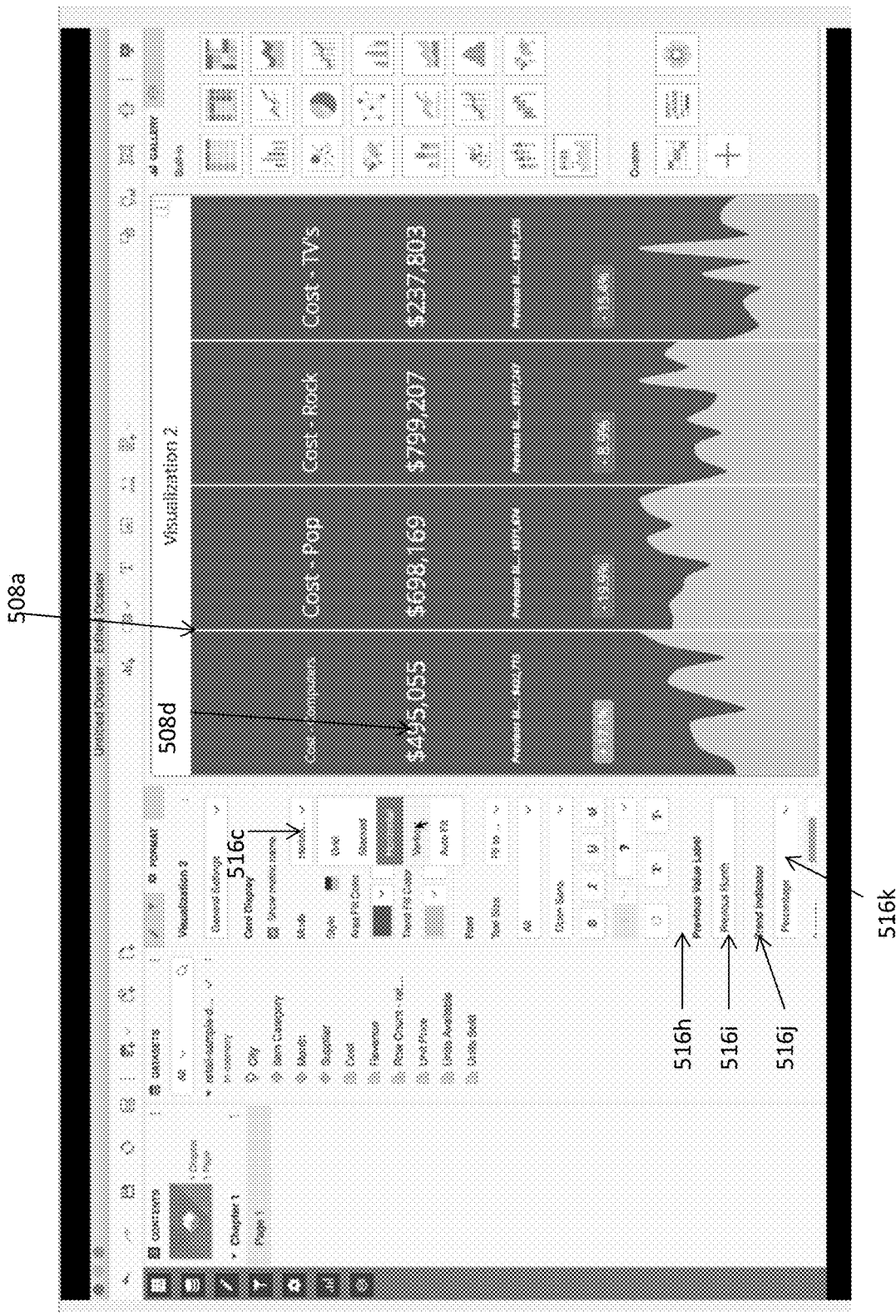
Figure 10:
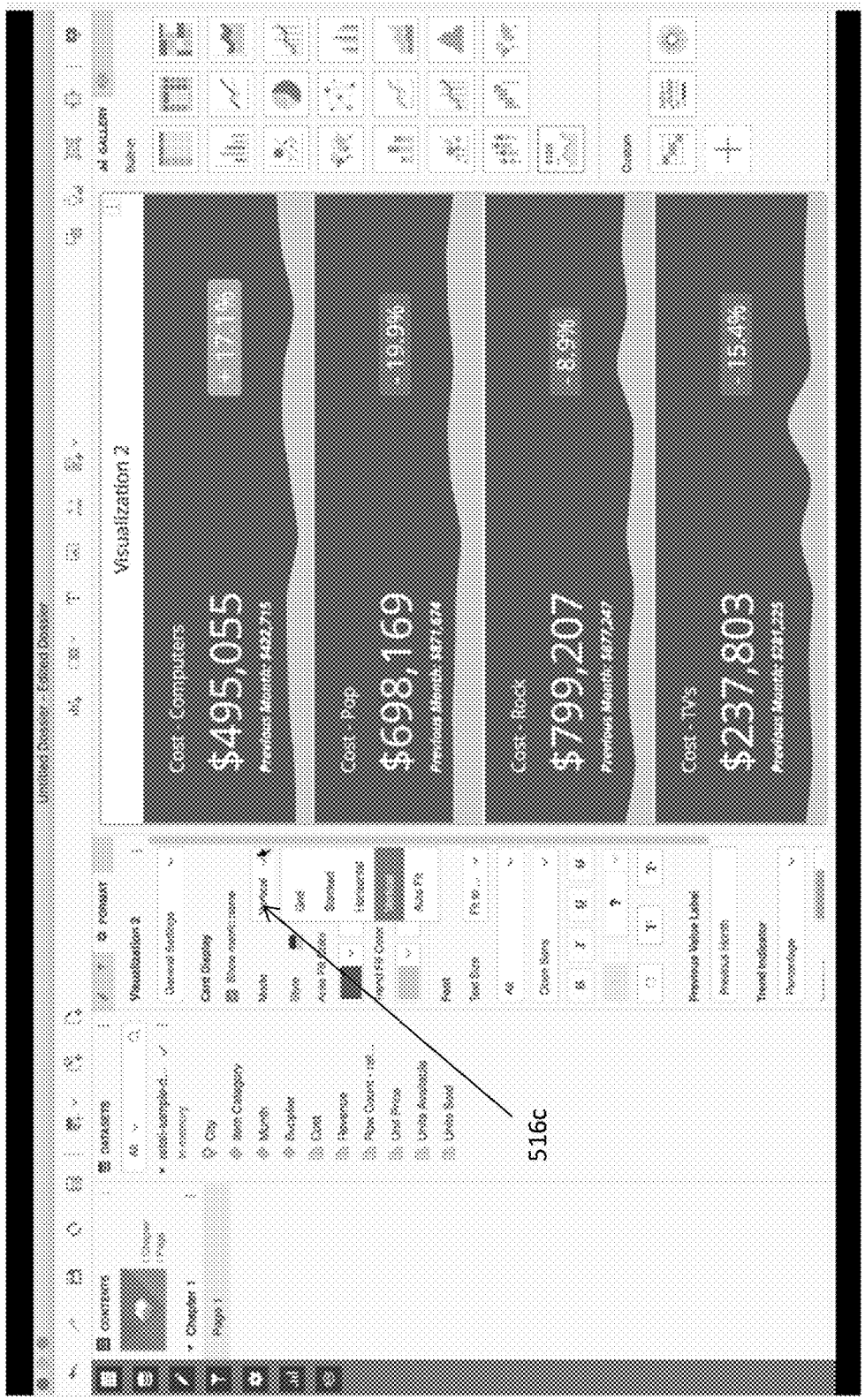

As is illustrated in FIG. 9, the drop down menu in the mode selection option 516c provides a variety of arrangement options. As detailed above, FIGS. 7 and 8 illustrate the KPI cards 508a arranged in a grid. The drop down menu also lists other arrangement options including the following non-limiting examples: stacked, horizontal, vertical and auto-fit. FIG. 9 illustrates a plurality of KPI cards 508a arranged in a horizontal arrangement. FIG. 10 illustrates the plurality of KPI cards 508a arranged in a vertical arrangement.

Figure 11:

FIG. 11 illustrates the KPI cards 508a in a stacked mode. In the stacked mode, the KPI cards 508a are stacked on top of each other such that only one KPI card 508a is displayed at a time. To view the other KPI cards 508a, the user must click on forward and back arrows in a KPI navigation option 508f (e.g., slide-show format). The KPI navigation option 508f also includes the current KPI card 508a by number and the total number of KPI cards available in the stack.

Figure 12:
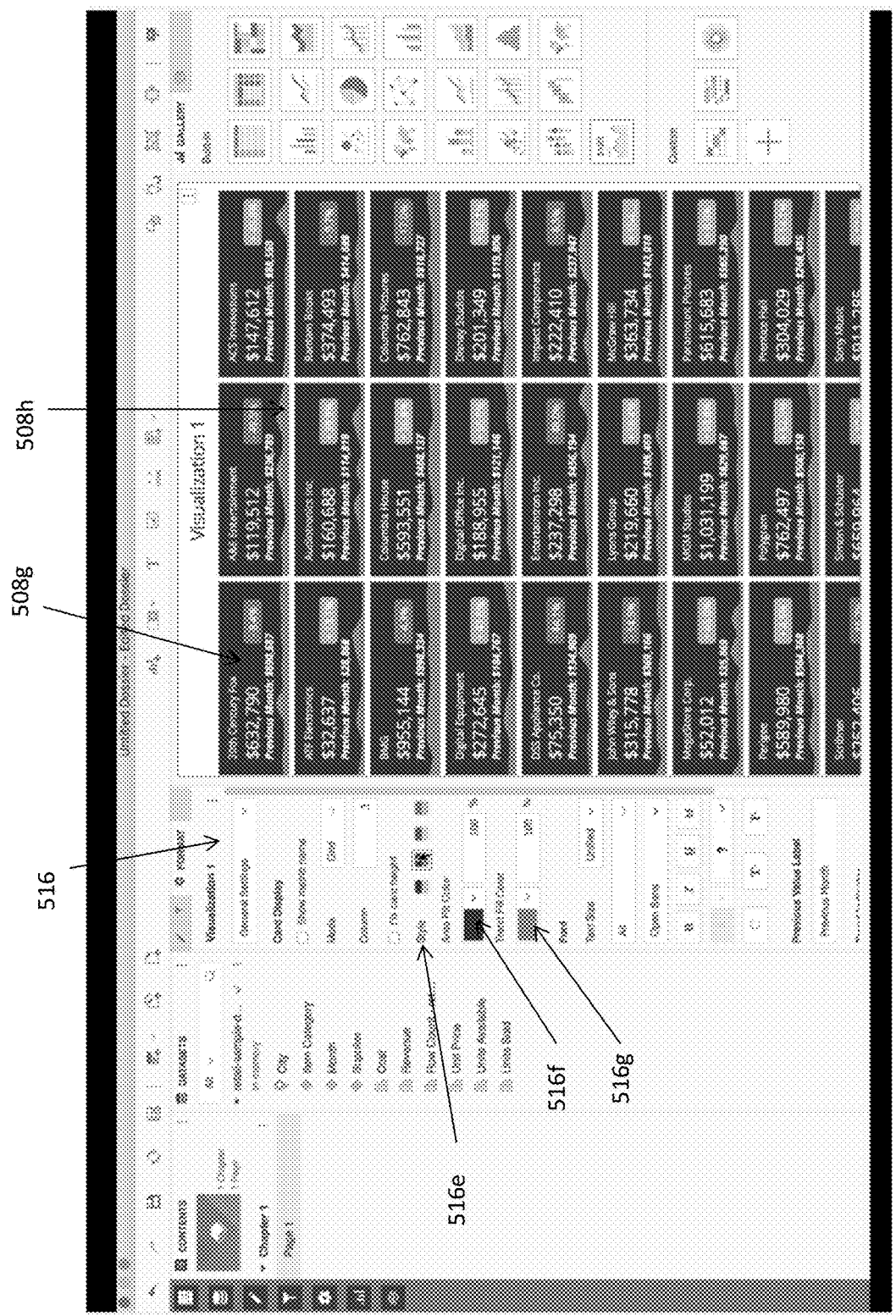
Figure 13:
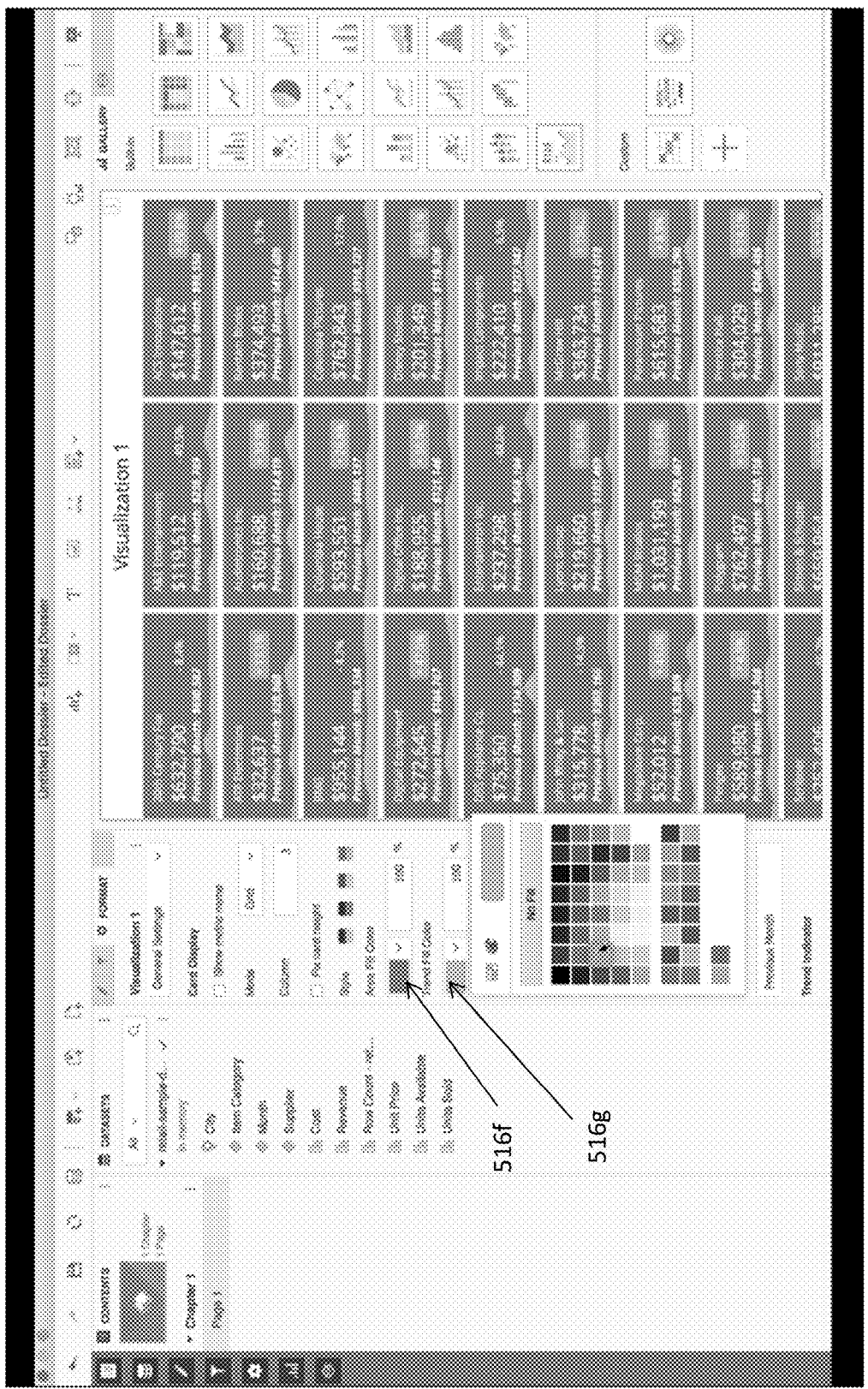

The format panel 516 also includes options for changing the color of the KPI cards 508a. The first option, illustrated in FIG. 12, is the "Style" option 516e, which includes one or more variations of two colors stacked on top of each other. The top color in the stack corresponds to the fill color of the area (background) 508g of the KPI cards 508a and the bottom color in the stack corresponds to the fill color of the trend portion 508h of the KPI card 508a. If using the "Style" option 516e, the user must select one of the provided color pairing options. The second option, allows the user to customize the colors in the KPI card 508a. As is illustrated in FIG. 13, the user can individually select the color using the "Area Fill Color" option 516f and the "Trend Fill Color" option 516g. For example, the "Trend Fill Color" option 516g (and similarly the "Area Fill Color" option 516f) includes a drop down menu providing a plurality of user-selectable color choices. With either option, the system automatically updates the color of the area (background) 508g and the trend portion 508h in all of the KPI cards 508a based on the user selections.

Returning to FIG. 9, the format panel 516 includes an option 516h for defining the "Previous Value Label." In FIG. 9, the "Previous Value Label" option 516h lists "Previous Month" in its selection box 516i. This is also displayed in the KPI cards 508a in the corresponding "Previous Value Display" 508d (in FIG. 9 "Previous Month" is illustrated). Using the selection box 516i of the "Previous Value Label" option 516h, the user may change the string displayed in the KPI card 508a.

Figure 14:
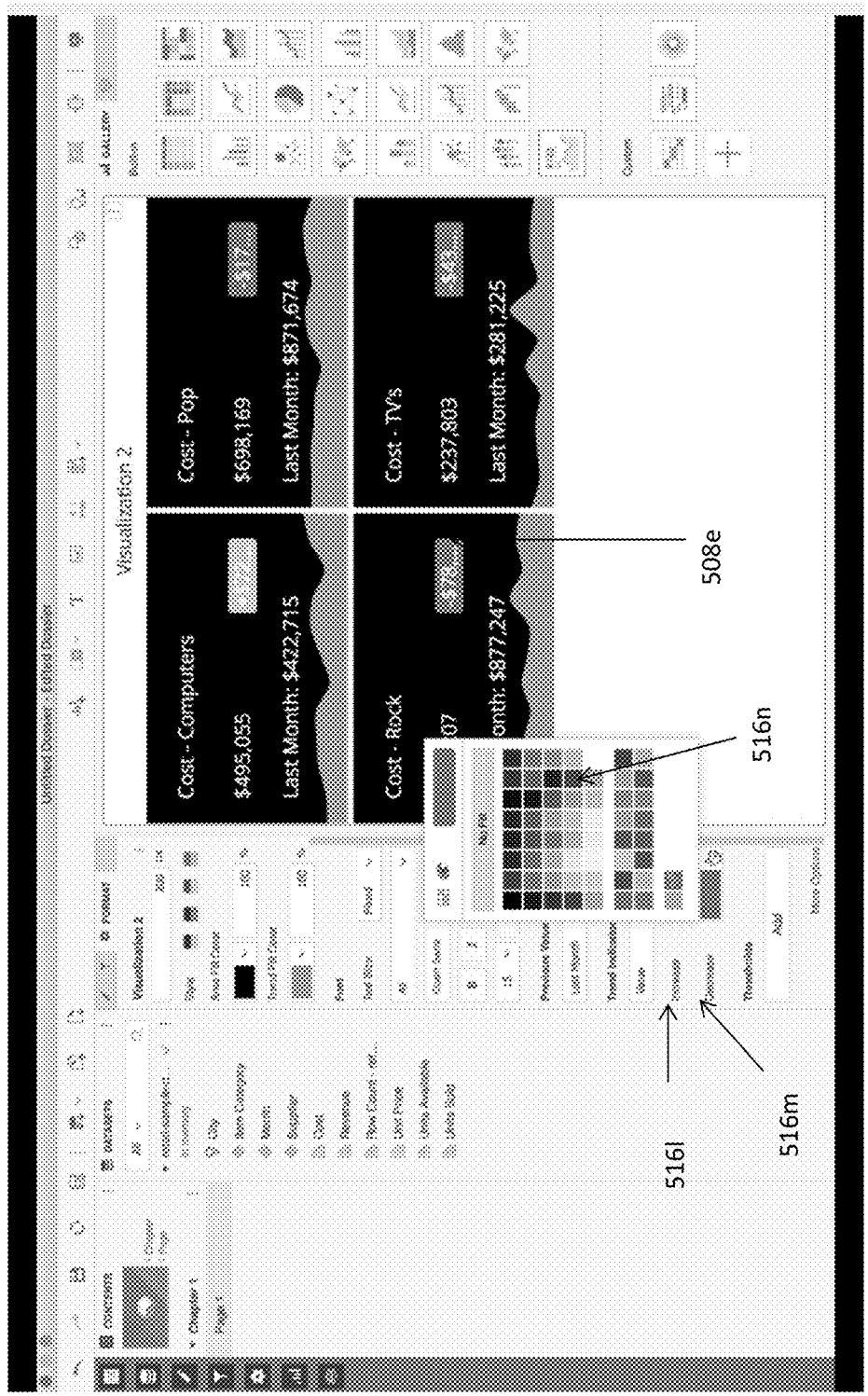

The format panel 516 also includes a "Trend Indicator" option 516j, which includes options for formatting the "Trend Indicator" badge 508e. First, using a drop down selection menu 516k in the "Trend Indicator" option 516j, the user can select whether the trend is displayed as a percentage of change (e.g., see FIG. 9) or as a total value of change (e.g., see FIG. 14). As is further illustrated in FIG. 14, the "Trend Indicator" option 516j also allows a user to select a color for the the "Trend Indicator" badge 508e. Specifically, as is illustrated in FIG. 14, the user can set two different color options for a case where the trend is increasing 516l and decreasing 516m. In each case, the user can select a specific color from a plurality of colors in a color pop up menu 516n. This provides a distinct visual cue for the user to easily differentiate increasing and decreasing trends.

Figure 15:
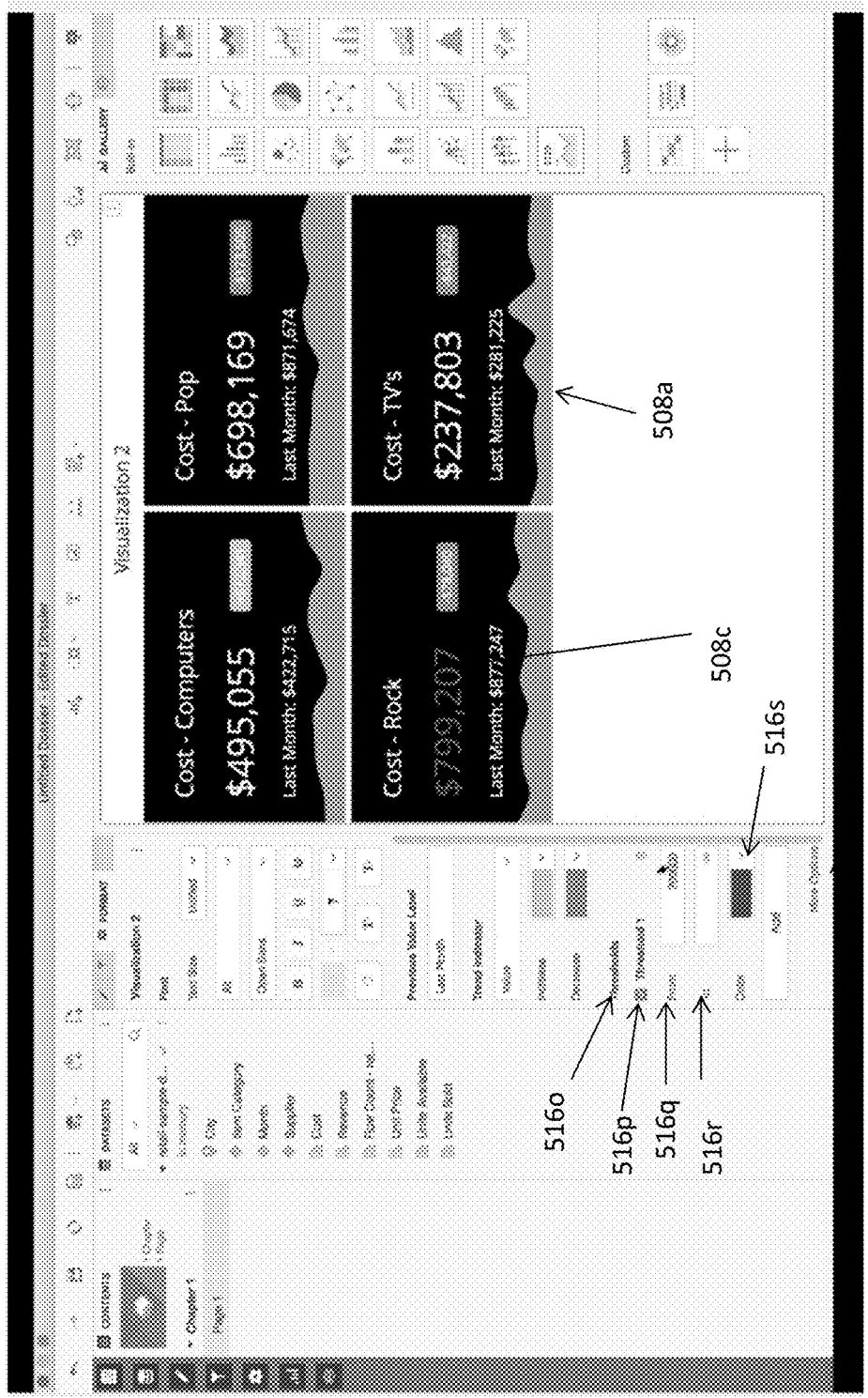

The format panel 516 also includes a threshold option 516o to add a threshold value, as is illustrated in FIG. 15. The threshold value defines a limit(s) for the main metric 508c (e.g., "Cost" in the examples illustrated in the figures). To include a threshold, the user can check a selectable "Threshold" box 516p (similarly, to remove the threshold the user merely unchecks the box 516p). Then, the user can set a minimum value/lower limit 516q for the threshold (e.g., "From" box) and a maximum value/upper limit 516r (e.g., "To" box). Finally, the user can select a color for the text corresponding to the threshold using a color selection menu 516s, similar to the menu 516n illustrated in FIG. 14. Once the user sets the threshold, the system will automatically display any of the main metrics 508c (e.g., "Cost") that have a value within the threshold amounts in the color set in the menu 516s. For example, in FIG. 15, the user set the minimum value/lower limit 516q of the threshold at $700,000 and set the maximum value/upper limit 516r to infinite. Thus, the text in the main metric 508c in the KPI card 508a in the bottom, left hand corner of FIG. 15 corresponding to "Rock" illustrates a color different from that of the other KPI cards 508a. That is, the cost for "Rock" was $799,207, which is within the threshold range, while the costs for "Computers," "Pop" and "TVs" were all below the threshold amount of $700,000.

Figure 16:
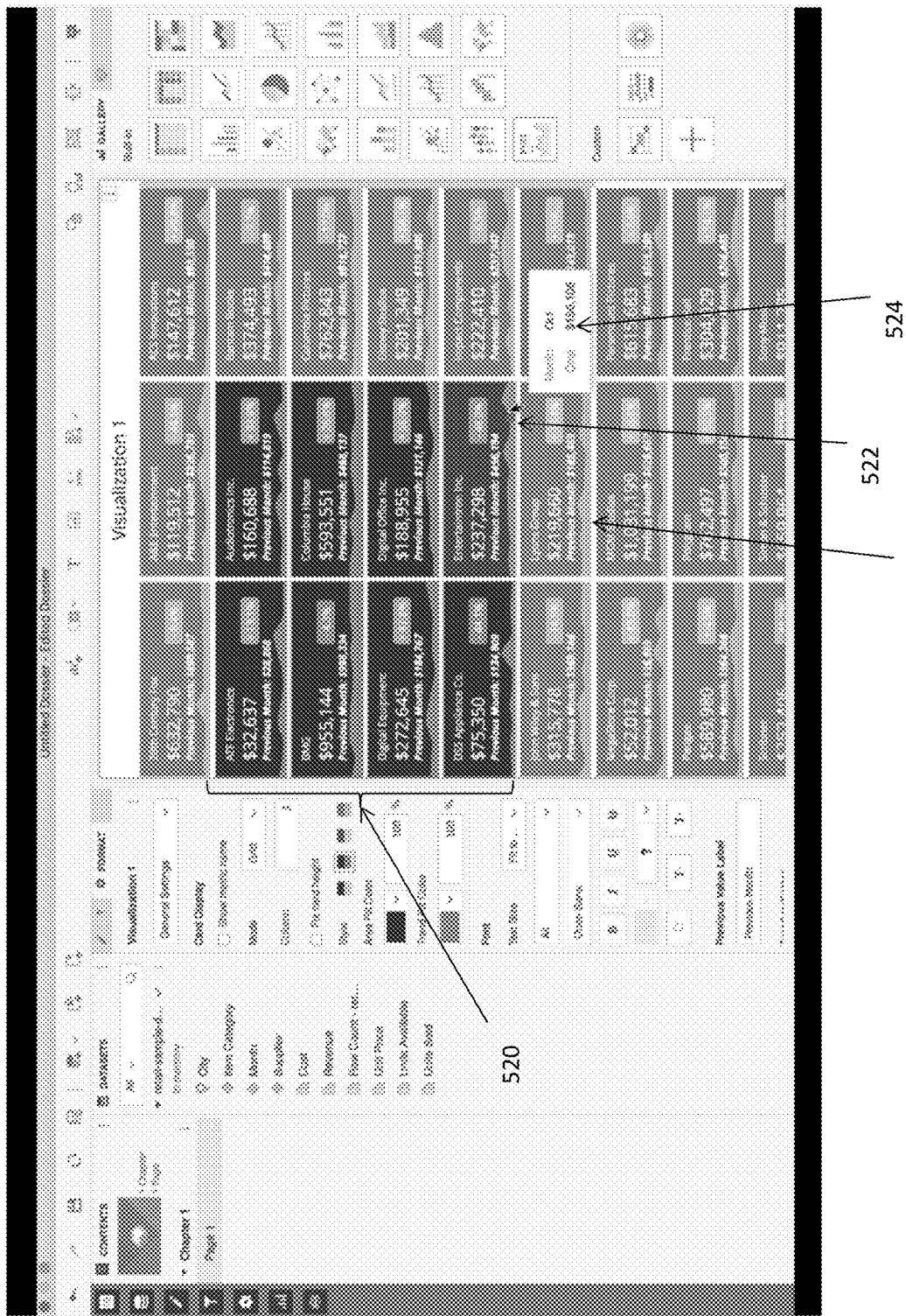
Figure 17:
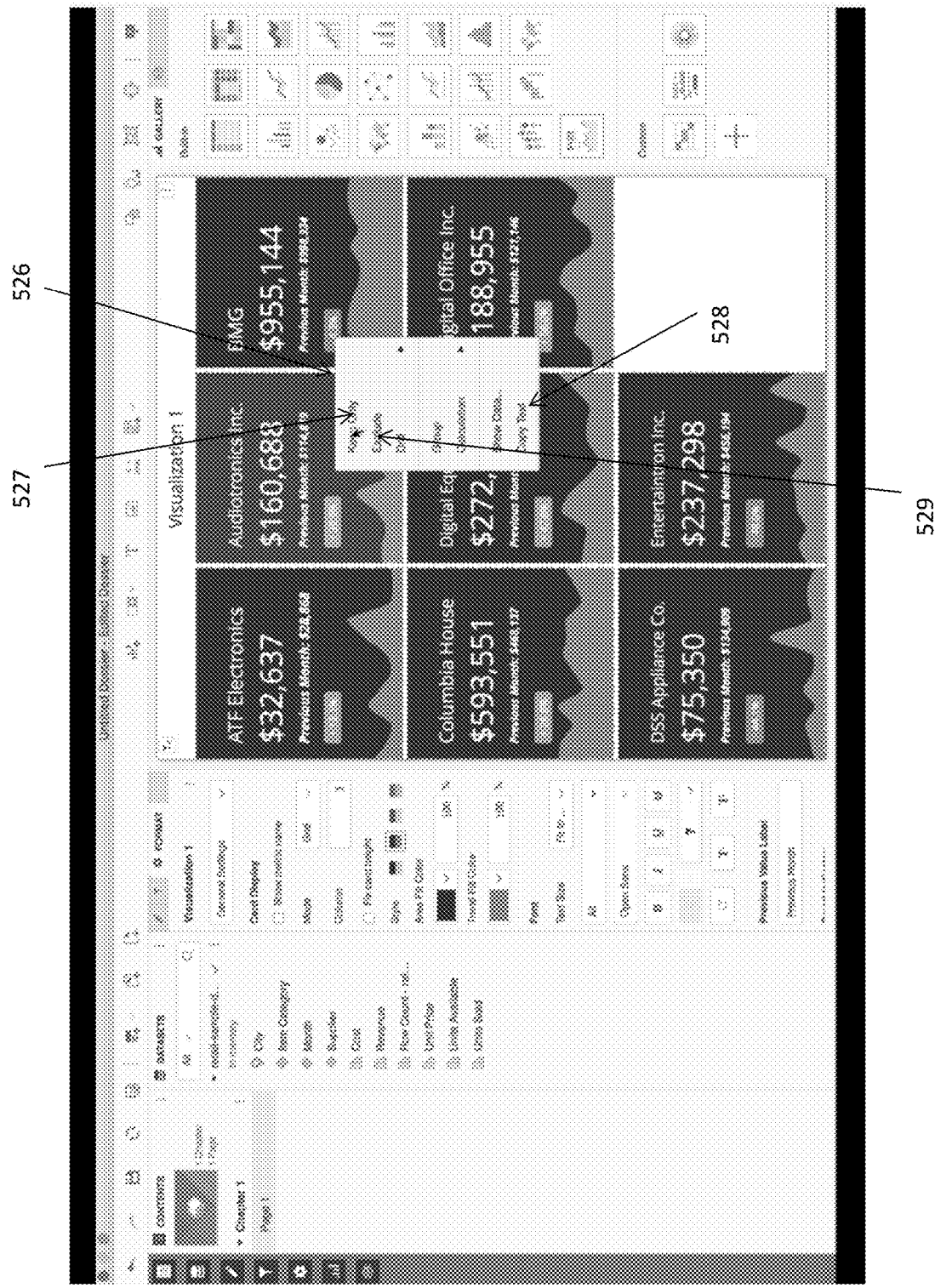

As is illustrated in FIG. 16, the user can highlight a selection 520 of one or more of the displayed KPI cards 508a. As is illustrated in FIG. 16, the user has a selected eight of the displayed KPI cards 508a. The user can highlight certain KPI cards 508a by clicking on a KPI card and holding while dragging the cursor over the desired KPI cards 508a. A bounding window will appear over the selected KPI cards. Once the user releases the cursor hold, the selected KPI cards 508a will be highlighted as illustrated in FIG. 16. Then, as illustrated in FIG. 17, an options menu 526 is presented. From the menu 526, the user can select the "Keep Only" function 527, which will remove all of the KPI cards except those highlighted by the user. Similarly, once the selected KPI cards 508a are highlighted, the user can select the "Exclude" function 529, which will remove the KPI cards highlighted by the user. Thus, as is illustrated in FIG. 17, only the selected KPI cards 508a remain in the dossier/report.

Additionally, the user can hover the cursor over a portion of the trend chart in the trend portion 508h. This will cause the system to display a dot 522 identifying a specific time along the chart in the trend portion 508h. The system will also display a point-in-time box 524 displaying the selected month (e.g., in FIG. 16 October) and the corresponding value of the metric (e.g., in FIG. 16 the cost value) during that time (e.g., month).

Figure 18:
Figure 19:
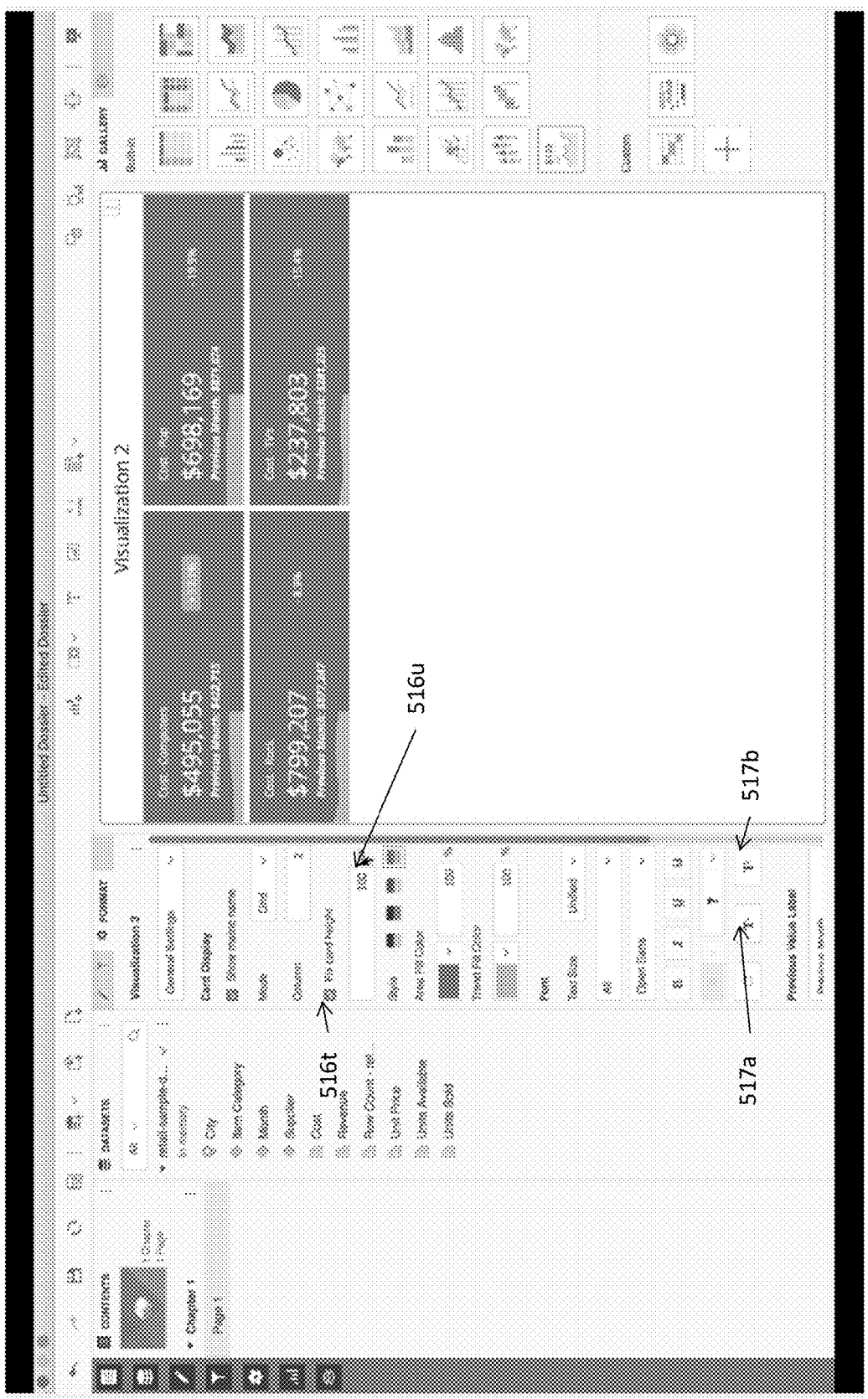

As is also illustrated in FIG. 17, in accordance with an exemplary aspect of the present invention, the user can copy the text from the KPI cards 508a and paste the text in another file, document or program. That is, the user can click on one or more of the displayed KPI cards 508a. Once the use clicks on the highlighted KPI card(s) 508a, the options menu 526 is again presented. From the menu 526, the user can select the "Copy Text" function 528, which will copy all of the text from the KPI cards 508a. As is illustrated in FIG. 18, the user can then paste the text only from the KPI cards 508a in another file, document or program.

The system also allows a user to fix or customize the height of the KPI cards. That is, the format panel 516 includes an option to fix the height of the KPI cards 508a.

When the box is checked in the "Fix Card Height" option 516*t*, the height of all of the KPI cards 508*a* is fixed at a same height. If the user unchecks the box, the card height is calculated based on the container height. For example, if there are three rows of cards and the height of the container is 300, then the height of each card height would be 100 if the checkbox is unchecked. The user can set the height of the KPI cards 508*a* by entering a height in the height selection box 516*u*.

Figure 20:
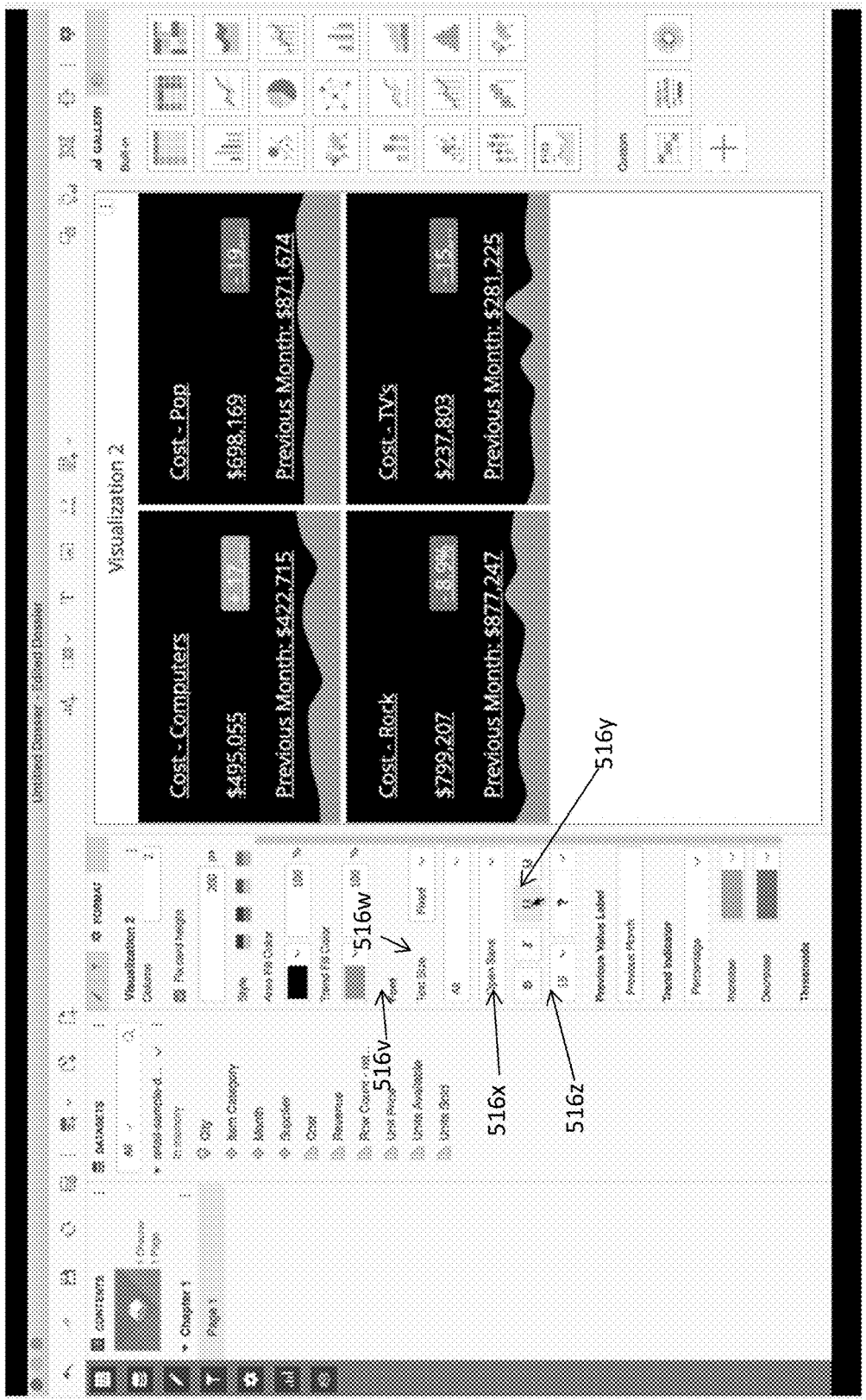

Furthermore, as is illustrated in FIG. 20, the user can format the font of the text in the KPI cards 508*a*. The format panel 516 includes a font section 516*v* including options for changing the settings for text size 516*w*, the font type 516*x*, and setting text emphasizers 516*y* such as, for example, bold, underline, italics, and strikethrough. With regard to the settings for text size 516*w*, the use can, using a drop down menu, select to have the font size fixed across all KPI cards 508*a* or the user can select a "Fit to Container" option, which allows the option to change the font size to fit within the data container. Also, the user can select a specific font size 516*z* for the information in the KPI cards 508*a*. Finally, referring back to FIG. 19, the format panel 516 also provides a font size increase function 517*a* and a font size decrease function 517*b* that allows a user to inclemently increase or decrease the font size.

Figure 21:
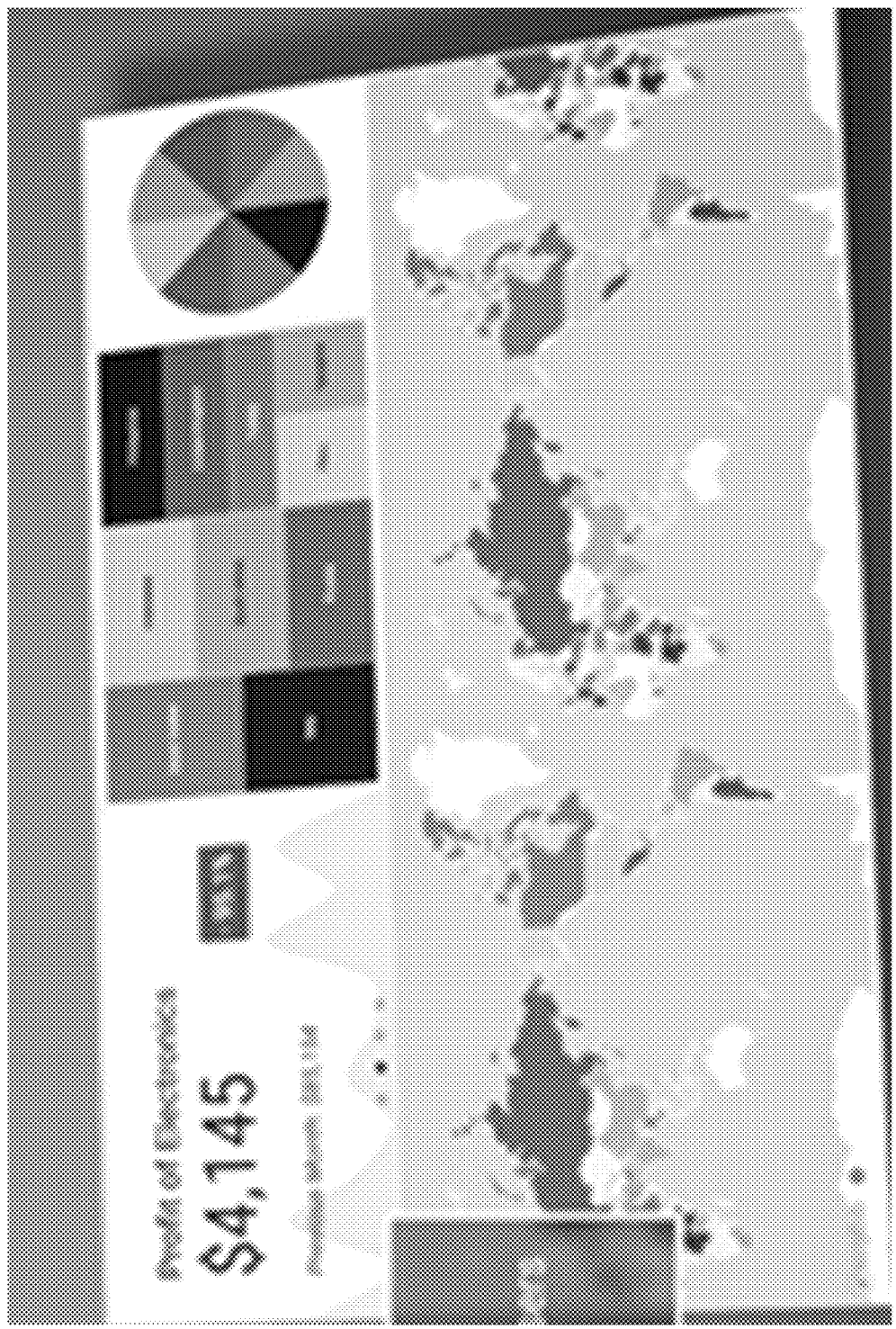
Figure 22:
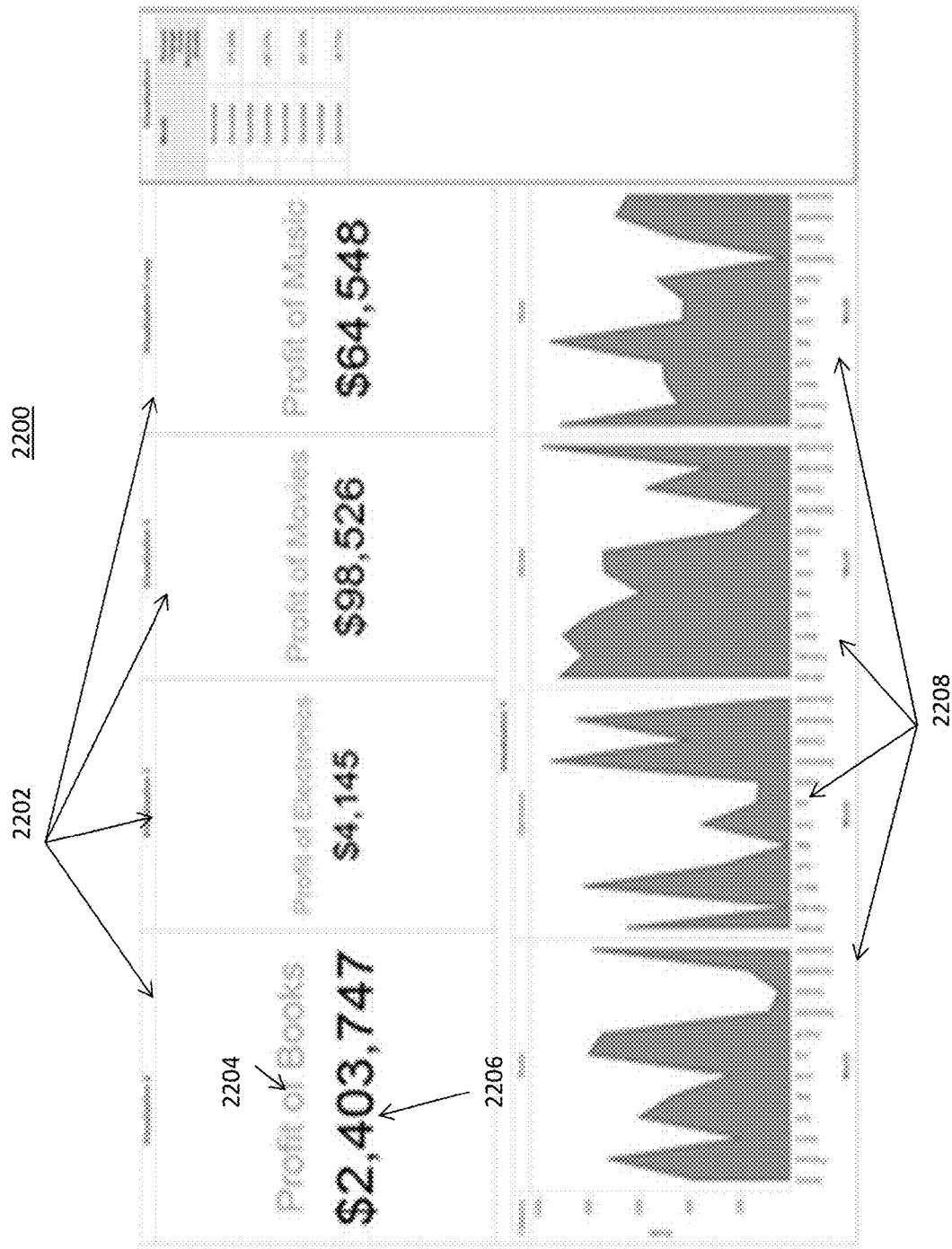
FIG. 22 illustrates a report/dossier 2200 including a conventional KPI visualization.

As is illustrated in FIG. 21, the KPI 508 can also be used in a report/dossier with other visualizations to provide a deeper insight into the data.

Accordingly, the present invention provides a report building system and method for business analytics that.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method, comprising:
   retrieving a dataset from a database;
   creating a report including a graphical representation of the dataset, the graphical representation of the dataset including a customizable, responsive visualization of a key performance indicator, said customizable, responsive visualization of the key performance indicator including a metric and an attribute, and said customizable, responsive visualization of the key performance indicator visualizing a current value of the metric and a trend in the metric; and
   displaying the report on a graphical user interface,
   wherein the customizable, responsive visualization of the key performance indicator simultaneously and separately displays the current value of the metric, a previous value of the metric in a previous time period, a comparison between the current value of the metric and the previous value of the metric, and a graph illustrating changes in the value of the metric over time.

2. The method according to claim 1, wherein said creating a report includes automatically generating a plurality of key performance indicator visualization cards.

3. The method according to claim 2, further comprising automatically arranging the plurality of key performance indicator visualization cards into an array.

4. The method according to claim 2, wherein each of said plurality of key performance indicator visualization cards displays the current value of a metric, an attribute name, a value of the metric during a previous time period, a comparison between the current value of the metric and the value of the metric during the previous time period and a trend chart.

5. The method according to claim 1, wherein the trend identifies progress of the metric over time.

6. The method according to claim 1, wherein the report includes a data set panel including selectable attributes and selectable metrics, and
   wherein a user can modify the customizable, responsive visualization of the key performance indicator by dragging one or more attributes and one or more metrics to the customizable, responsive visualization of a key performance indicator.

7. The method according to claim 1, wherein the customizable, responsive visualization of the key performance indicator displays the current value of the metric, a previous value of the metric in a previous time period and a comparison between the current value of the metric and the previous value of the metric.

8. The method according to claim 1, wherein the graph illustrating changes in the value of the metric over time is a user-interactive graph configured to allow a user to select a point-in-time along the graph, and
   wherein when the user selects the point-in-time along the graph, a point-in-time box is displayed displaying the selected time and a corresponding value of the metric.

9. The method according to claim 1, wherein the comparison between the current value of the metric and the previous value of the metric is displayed in a trend indicator, and
   wherein the trend indicator is configured to selectably display the comparison as a percentage of change in value and a total amount of change in value.

10. The method according to claim 2, wherein the report includes a format panel configured to allow a user to select an arrangement of the plurality of key performance indicator visualization cards.

11. The method according to claim 10, wherein the format panel includes a plurality of user selectable arrangement modes including grid, stacked, horizontal, vertical and auto-fit.

12. A non-transitory computer processor-readable storage medium storing instructions configured for execution by a computer for:
   retrieving a dataset from a database;
   creating a report including a graphical representation of the dataset, the graphical representation of the dataset including a customizable, responsive visualization of a key performance indicator, said customizable, responsive visualization of the key performance indicator including a metric and an attribute, and said customizable, responsive visualization of the key performance indicator visualizing a current value of the metric and a trend in the metric; and
   displaying the report on a graphical user interface,
   wherein the customizable, responsive visualization of the key performance indicator simultaneously and separately displays the current value of the metric, a previous value of the metric in a previous time period, a comparison between the current value of the metric and the previous value of the metric, and a graph illustrating changes in the value of the metric over time.

13. A system, comprising:
   a database storing a dataset;
   a processor configured to create a report including a graphical representation of the dataset, the graphical representation of the dataset including a customizable, responsive visualization of a key performance indicator, said customizable, responsive visualization of the key performance indicator including a metric and an attribute, and said customizable, responsive visualization of the key performance indicator visualizing a current value of the metric and a trend in the metric; and a graphical user interface configured to display the report, wherein the customizable, responsive visualization of the key performance indicator simultaneously and separately displays the current value of the metric, a previous value of the metric in a previous time period, a comparison between the current value of the metric and the previous value of the metric, and a graph illustrating changes in the value of the metric over time.

* * * * *